United States Patent
Kumar Ujjwal

(10) Patent No.: US 10,880,099 B2
(45) Date of Patent: Dec. 29, 2020

(54) METHOD AND SYSTEM FOR PROTECTING COMPUTING DEVICES FROM MALWARES

(71) Applicant: WIPRO LIMITED, Bangalore (IN)

(72) Inventor: Rajeev Kumar Ujjwal, Bangalore (IN)

(73) Assignee: Wipro Limited, Bangalore (IN)

( * ) Notice: Subject to any disclaimer, the term of this patent is extended or adjusted under 35 U.S.C. 154(b) by 248 days.

(21) Appl. No.: 16/043,204

(22) Filed: Jul. 24, 2018

(65) Prior Publication Data

US 2019/0363894 A1    Nov. 28, 2019

(30) Foreign Application Priority Data

May 23, 2018 (IN) .............................. 201841019403

(51) Int. Cl.
*H04L 9/32* (2006.01)
*G06F 21/57* (2013.01)
*G06F 21/56* (2013.01)

(52) U.S. Cl.
CPC .......... *H04L 9/3265* (2013.01); *G06F 21/566* (2013.01); *G06F 21/575* (2013.01); *G06F 21/577* (2013.01)

(58) Field of Classification Search
CPC .... G06F 21/566; G06F 21/575; G06F 21/577; H04L 9/3265
See application file for complete search history.

(56) References Cited

U.S. PATENT DOCUMENTS 8,694,761 B2   4/2014  Zimmer et al.
9,021,244 B2   4/2015  Bobzin
2010/0083002 A1   4/2010  Cui et al.
2012/0023568 A1*  1/2012  Cha .................... H04L 63/0807 726/10
2014/0380031 A1* 12/2014  Jones ................... G06F 21/572 713/2

(Continued)

OTHER PUBLICATIONS

F. Adelstein • M. Stillerman • D. Kozen; Malicious code detection for open firmware; 18th Annual Computer Security Applications Conference, 2002. Proceedings. (pp. 403-412); (Year: 2002).*

(Continued)

*Primary Examiner* — Luu T Pham
*Assistant Examiner* — Chao Wang
(74) *Attorney, Agent, or Firm* — Finnegan, Henderson, Farabow, Garrett & Dunner, LLP

(57) ABSTRACT

This disclosure relates method and system for protecting a computing device from a malware. In one embodiment, the method may include determining a digital trust certificate of a set of computing instructions to be executed by the computing device. The set of computing instructions may form a part of a boot process of the computing device, and may be a firmware, a boot loader, a kernel, a system driver, a start-up file, or an antimalware. The method may further include establishing a chain of trust by validating the digital trust certificate with the computing device. The digital trust certificate may be pre-registered with a local database, accessible by the computing device, by communicating with a centralized certificate authority and policy server. Upon a positive establishment of the chain of trust, the method may further include allowing an execution of the set of computing instructions by the computing device.

13 Claims, 6 Drawing Sheets

(56) References Cited

U.S. PATENT DOCUMENTS

2015/0193620 A1 7/2015 Khatri et al.
2018/0039795 A1* 2/2018 Gulati .................. G06F 21/76

OTHER PUBLICATIONS

Mark Nelson • Peter-Michael Seidel; Modeling and Analysis of Trusted Boot Processes Based on Actor Network Procedures; 2015 16th International Workshop on Microprocessor and SOC Test and Verification (MTV) (pp. 54-59); (Year: 2015).*

Lohr, H. • Sadeghi, A.-R. • Winandy, M.; Patterns for Secure Boot and Secure Storage in Computer Systems; 2010 International Conference on Availability, Reliability and Security (pp. 569-573); (Year: 2010).*

Chaudhari, P., "What is the difference between Secure Boot and Trusted Platform Module given that both involves Trusted Hardware?", https://quora.com/in/What-is-the-difference-between-Secure-Boot-and-Trusted-Platform-Module-given-that-both-involves-Trusted-Hardware, (2016), pp. 1-14.

Manan, V., et al., "Windows Secure Boot Key Creation and Management Guidance", https://docs.microsoft.com/en-us/windows-hardware/manufacture/desktop/windows-secure-boot-key-creation-and-management-guidance, (2017), pp. 1-30.

* cited by examiner

METHOD AND SYSTEM FOR PROTECTING COMPUTING DEVICES FROM MALWARES

TECHNICAL FIELD

This disclosure relates generally to computer security, and more particularly to method and system for protecting a computing device from a malware.

BACKGROUND

With rapid advancements in computing technologies and ubiquity of computing devices, ensuring security of the computing devices has become all the more important. However, it is observed that security protocols are typically not followed by the users. As will be apparent to those skilled in the art, various types of processors and firmware may be employed in the computing devices, and in case the processors and firmware do not boot securely, the applications, systems, infrastructure and the personal data may be left vulnerable to various security threats.

The system firmware may be periodically updated in order to fix bugs, patch vulnerabilities, and introduce compatibility with new hardware. However, an unauthorized or unauthenticated update may expose the system to various vulnerabilities to the security of basic input/output system (BIOS) in the computer architecture. A damage to the BIOS, in form of an attack by a malicious software (that is, a malware), may disable the computing device to boot, and may even damage the computer system permanently. As the BIOS run during booting of the computing device prior to any anti-malware solution may come into action, an infection by malicious software in the BIOS may be difficult to detect or correct. Additionally, since the BIOS may be stored on flash memory on the motherboard, even reformatting or replacing hard drives may not rid the BIOS off the infection. By way of example, some of the well-known incidents of infection of the BIOS may include Chernobyl or Spacefiller (CIH) infection and the Mebromi Trojan horse virus that led permanent damage to the BIOS contents and associated computing devices.

Various vulnerabilities to the BIOS of the computing devices have been identified in the past. For example, "Secure Boot Component Vulnerability", identified in 2016, allowed attackers to bypass MICROSOFT SECURE BOOT protection mechanism. Another vulnerability was identified that allowed bypassing of the MICROSOFT DEVICE GUARD protections for systems running WINDOWS 10. Further, some LENOVO products using UEFI (BIOS) code developed by AMERICAN MEGATRENDS, INC. (AMI) were found to be infected in August 2017. The infection allowed an attacker with administrative privileges or physical access to a system to run specially crafted code which allowed them to bypass system protections, such as DEVICE GUARD AND HYPER-V. Further, in October 2017, a vulnerability was identified that allowed attackers with local or physical access to bypass enforcement of integrity protections via manipulation of firmware storage in system firmware for INTEL next unit of computing (NUC) kits such as NUC7i3BNK, NUC7i3BNH, NUC7i5BNK, NUC7i5BNH, NUC7i7BNH versions.

It may be noted that National Institute of Standards and Technology (NIST) has prescribed certain standards, such as NIST 800-147/NIST 800-147B, according to which a malicious modification of the BIOS by a malicious software constitute a significant threat. This may be because of BIOS's unique and privileged position within the computer architecture, wherein such modification of the BIOS may lead to permanent denial of service (if the BIOS is corrupted) and/or a persistent presence of the malware (if the BIOS is implanted with malware). According to INTEL'S Product Security Incident Response Team (PSIRT), attacks pertaining to rootkits and bootkits on unified extensible firmware interface (UEFI) with secure boot have increased in the past 3 years. By way of an example, the BIOS rootkits or bootkits may include, but may not be limited to, system management mode (SMM) rootkit, Computrace, DerStarke, Secureboot Bypass, PEIBackdoor, SMM Backdoor and UEFI Implant bootkits.

Various security measures exist for resolving the UEFI rootkit or UEFI bootkit infections. However, the existing solutions do not provide for creating and managing secure boot keys. Further, there exists no centralized policy for creating and managing the secure boot keys so as to prevent the secure boot module from the UFEI rootkits/bootkits infections.

SUMMARY

In one embodiment, a method for protecting a computing device from a malware is disclosed. In one example the method may include determining a digital trust certificate of a set of computing instructions to be executed by the computing device. The set of computing instructions may form a part of a boot process of the computing device, and may form a firmware and at least one of a boot loader, a kernel, a system driver, a start-up file, or an antimalware. The method may further include establishing a chain of trust by validating the digital trust certificate with the computing device. The digital trust certificate may be pre-registered with a local database accessible by the computing device, and the pre-registration may be performed by a centralized certificate authority and policy server in a past instance of a successful boot. Upon a positive establishment of the chain of trust, the method may further include allowing an execution of the set of computing instructions by the computing device.

In one embodiment, a system for protecting a computing device from a malware is disclosed. The system may include the computing device, which may include at least one processor and a computer-readable medium storing instructions that, when executed by the at least one processor, cause the at least one processor to perform various operations. In one example, the computer-readable medium may cause the at least one processor to determine a digital trust certificate of a set of computing instructions to be executed by the computing device. The set of computing instructions may form a part of a boot process of the computing device, and may form a firmware and at least one of a boot loader, a kernel, a system driver, a start-up file, or an antimalware. The computer-readable medium may further cause the at least one processor to establish a chain of trust by validating the digital trust certificate with the computing device. The digital trust certificate may be pre-registered with a local database accessible by the computing device, and the pre-registration may be performed by a centralized certificate authority and policy server in a past instance of a successful boot. Upon a positive establishment of the chain of trust, the computer-readable medium may further cause the at least one processor to allow an execution of the set of computing instructions by the computing device.

In one embodiment, a non-transitory computer-readable medium storing computer-executable instructions for protecting a computing device from a malware is disclosed. In one example, the stored instructions, when executed by a processor, may cause the processor to determine a digital trust certificate of a set of computing instructions to be executed by the computing device. The set of computing instructions may form a part of a boot process of the computing device, and may form a firmware and at least one of a boot loader, a kernel, a system driver, a start-up file, or an antimalware. The stored instructions, when executed by the processor, may further cause the processor to establish a chain of trust by validating the digital trust certificate with the computing device. The digital trust certificate may be pre-registered with a local database accessible by the computing device, and the pre-registration may be performed by a centralized certificate authority and policy server in a past instance of a successful boot. Upon a positive establishment of the chain of trust, the stored instructions, when executed by the processor, may further cause the processor to allow an execution of the set of computing instructions by the computing device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
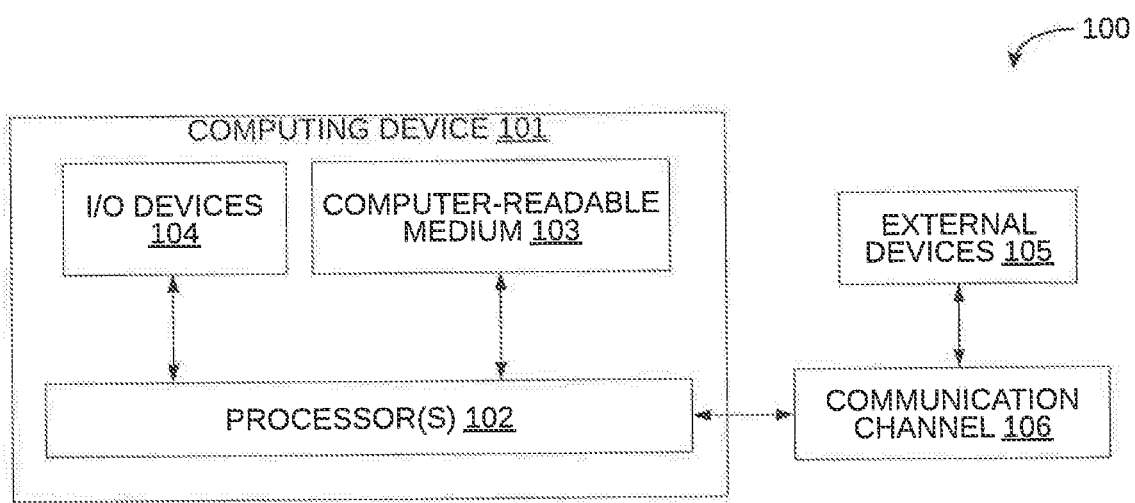
FIG. 1 is a block diagram of an exemplary system for protecting a computing device from a malware, in accordance with some embodiments of the present disclosure.

Referring now to FIG. 1, an exemplary system 100 for protecting the computing device 101 from a malware is illustrated, in accordance with some embodiments of the present disclosure. The computing device 101 may any processor based computing device including, but not limited to, a server, a desktop, a laptop, a notebook, a netbook, a tablet, a smartphone, a mobile phone, a smart watch, and a digital camera. Further, the malware may include, but may not be limited to, a rootkit infection, a bootkit infection, a virus, a worm, a Trojan horse, a ransomware, a remote access Trojan, a spyware, and an adware. The computing device 101 may include one or more processors 102, a computer-readable medium (e.g., a memory) 103, and one or more input/output (I/O) devices 104. The computer-readable storage medium 103 may store instructions that, when executed by the one or more processors 102, may cause the one or more processors 102 to protect the computing device 101 from a malware in accordance with some embodiments of the present disclosure. The computer-readable storage medium 103 may also store various instructions or data (e.g. digital trust certificate data, boot loader, kernel, system driver, operating system, start-up files, anti-malwares, trust keys, platform keys, boot guards, BIOS guard, operating system (OS) guard, etc.) that may be captured, processed, and/or required by the system 100.

The computing device 101 may also interact with one or more external devices 105 over a wired or a wireless communication channel 106 for sending or receiving various data. The external devices 104 may include, but are not limited to, a remote server, a digital device, or another computing device. For example, in some embodiments, the external device may be a centralized certificate authority and policy server that may maintain a repository for digital trust certificates (corresponding to various hardware or software that may be installed on the computing device 101) and implement a centralized managed policy so as to protect the computing device 101 (e.g., by preventing and avoiding UEFI rootkits or bootkits infections or threats). The computing device 101 may be in communication with the centralized certificate authority and policy server to access and to locally register instances of such digital trust certificates so as to maintain system integrity in accordance with the configured policy. The configured policy may verify any changes at each and every level of the computing device 101. The centralized certificate authority and policy server may also be referred to as Enterprise Security Guard on Guard Policy (ESG2P) server.

As will be appreciated by those skilled in the art, when the processor 102 starts, it may execute only some specific instructions at specific address. There may not be enough resources to start any code, and the processor 102 may be able to find, validate, install and run small initial piece of firmware. It will be further appreciated by those skilled in the art that, in a unified extensible firmware interface (UEFI) secure boot process, the security phase may form the basis for the Root of Trust. Thus, it may be difficult to change the operations during the security phase, as any such change may require a user gaining physical access to the computing device 101 and modifying or replacing hardware. The UEFI secure boot may involve a chain of trust which may flow form the security phase forming the basis for the Root of Trust. Further, the trust may be maintained via a public key cryptography. In some embodiments, a platform key (PK) representing the Root of Trust may be provided in the firmware by hardware manufacturers. A trust relationship with operating system vendors and users may be documented by signing their keys with the platform key (PK).

Establishing security may imply that a firmware may not execute any code unless it has been signed by a "trusted" key whether it's an operating system boot loader, a driver located in the flash memory of a PCI Express card or on disk, or an update of the firmware itself. Key Exchange Keys (KEK) may be added to the UEFI key database so that trusted third-party applications may use other certificates as long as they are signed with the private part of the PK.

Further, to manage the signing process, a centralized certificate authority may be employed. In some embodiments, the Certificate Authority (CA) operated by MICROSOFT, which is open to the industry, may be used. However, in alternative embodiments, organizations or service providers may set up their own certificate authority on a broader basis or for their exclusive use. Further, to address security threats, it may be important to enable secure boot or secure boot chain on the computing device 101. Additionally, it may be important to manage and control secure boot keys, trusted boot, measured/verified boot through a centrally managed policy, which may validate the integrity of firmware and may verify signature of each component of boot software. It should be noted that boot software may include, but may not be limited to, UEFI firmware drivers (also known as Option ROMs), EFI applications, and the operating system. If the signatures and keys are found to be valid, the computer may boot, and the firmware may give control to the operating system.

The ESG2P server may provide end to end root of trust by enabling verification of the system firmware and software components, and may establish strong hardware-rooted system integrity and hardware logic by OEM/BIOS manufacturers so as to reduce chances of hardware backdoors. Thus, the computing device 101 may utilize digital trust certificates and the centralized managed policy using the ESG2P server for effectively managing and controlling secure boot guards and their functionality so as to effectively verify the integrity of the boot systems.

Figure 2A:
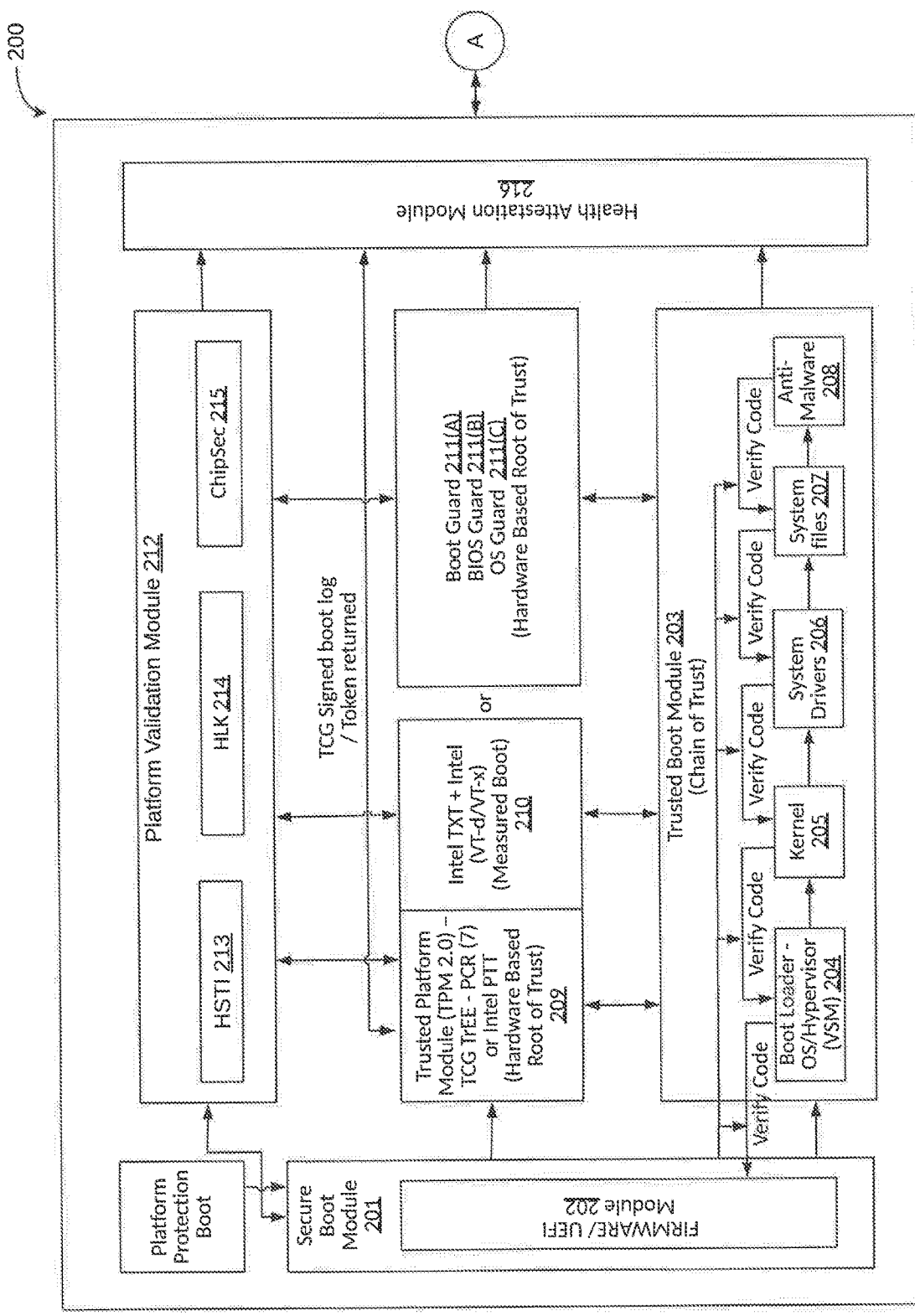
FIGS. 2A and 2B contain functional block diagrams of the system of FIG. 1, in accordance with some embodiments of the present disclosure.
Figure 2:
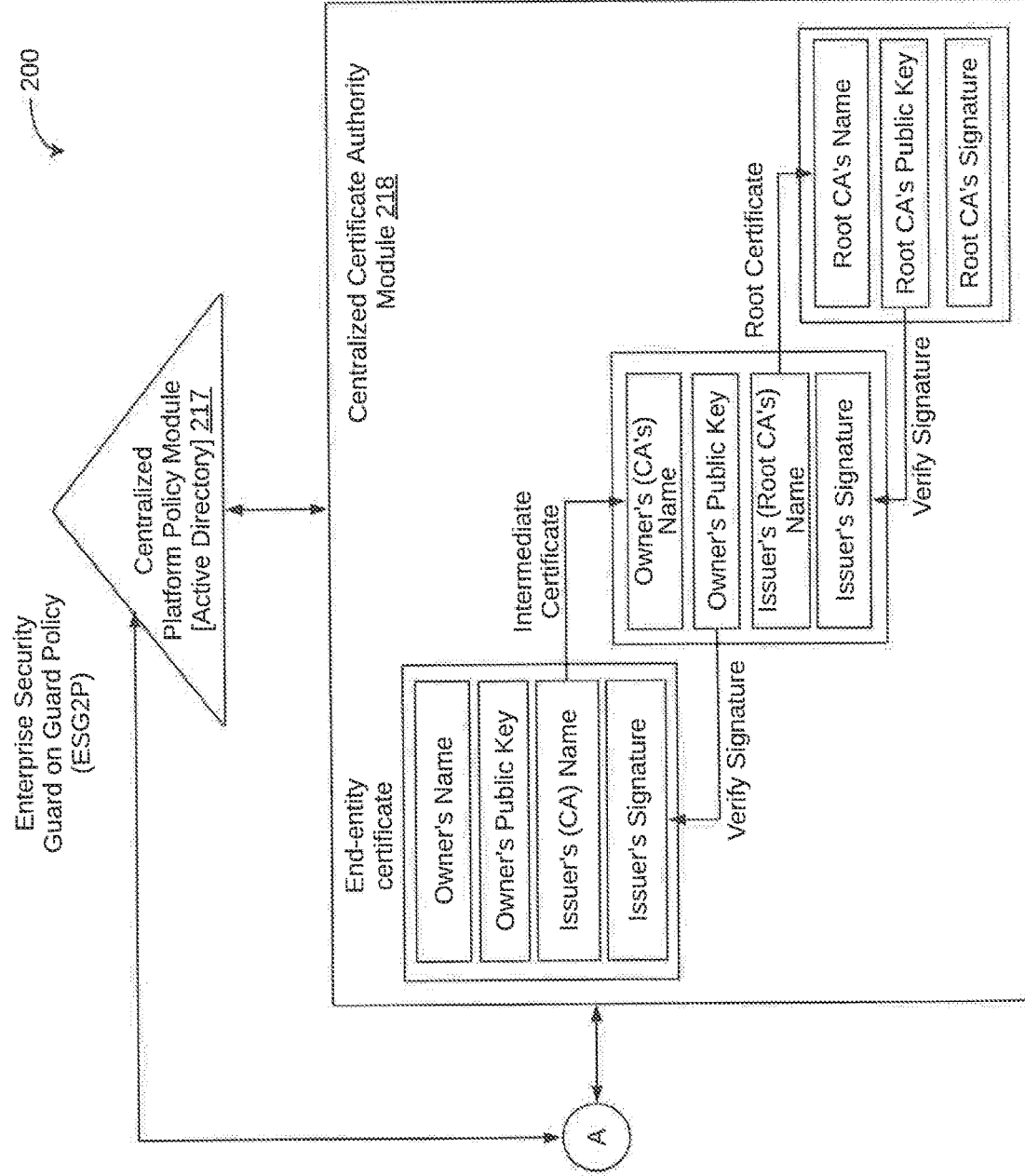

Referring now to FIGS. 2A and 2B, a functional block diagram of an exemplary system 200, analogous to the system 100 of FIG. 1, for protecting a computing device from a malware is illustrated, in accordance with some embodiments of the present disclosure. The system 200 may create and manage secure boot keys through a centralized platform policy so as to prevent system infections. The system 200 may include a secure boot module 201, a Unified Extensible Firmware Interface (UEFI) or Firmware module 202, a trusted boot module 203, a trusted platform module 209, a measured boot module 210, a platform validation module 212, a health attestation module 216, a centralized platform policy module 217, and a centralized certificate authority module 218.

The secure boot module 201 may be configured to protect the computing device from attacks and infection from a malware. The secure boot module 201 may be further configured to detect tampering with boot loaders, key Operating System (OS) files, and unauthorized loading of drivers (e.g., Option ROM) by validating digital signatures. Upon detecting an attempt of tampering, the system 200 may block such an attempt from running before it may attack or infect the device. The secure boot module 201 may further make sure that the computing device may boot using only a module that is trusted by the Original Equipment Manufacturer (OEM).

It should be noted that, in some embodiments, the computing device may be a personal computer (PC) equipped with Unified Extensible Firmware Interface (UEFI) so as to form secure boot system. The system 200 may, therefore, include the UEFI/Firmware module 202. The UEFI/Firmware module 202 may be configured to verify digital signature of each of the various components of the of secure boot module 201, such as UEFI firmware drivers and the operating system (OS). By way of an example, if the signatures are valid, the personal computer may boot, and the firmware may give control to the operating system. In other words, when the computing device equipped with UEFI starts, the computing device may first verify that the firmware is digitally signed thereby reduce the risk of firmware rootkits. Further, when the secure boot is enabled, the UEFI/Firmware module 202 may examine the bootloader's digital signature to verify that it has not been modified or tampered with.

The trusted boot module 203 may be configured to provide a chain of trust as the operating system boots. In some embodiments, the trusted boot module 203 may provide the chain of trust for all the components during the operating system boot process. For example, the chain of trust may include a hypervisor 204 (also referred to as pre-kernel module or boot loader OS) for Linux that may use INTEL Trusted Execution Technology (INTEL TXT) to perform measured and verified launch of the OS kernel or the hypervisor. The trusted boot module 203 may be further configured to protect the system, boot process, and anti-malware solution on certified devices that may include UEFI 2.3.1 hardware with the secure boot feature enabled. The trusted boot module 203 may also be configured to verify integrity of each of the various boot components in the OS. In some embodiments, the trusted boot module 203 may verify integrity of the boot components in the OS using verify codes that can be trusted. The trusted boot module 203 may, therefore, prevent bootkit infections that may inject into the OS boot process. The hypervisor 204 may be configured to verify the digital signature of a kernel 205 before loading it.

The trusted boot module 203 may further include a kernel 205 which may be configured to verify each of the other component of the OS startup process, such as boot drivers 206 (also referred to as system driver 206), startup files 207 (also referred to as system files 207), and antimalware launching components 208 (also referred to as antimalware 208). The chain of trust, therefore, may verify the signed code (true integrity) of each these component (boot loader 204, kernel 205, system driver 206, system files 207 and antimalware 208) so as to provide strong protection against tampering. In other words, the trusted boot module 203 may provide the chain of trust which may be established by validating each component of hardware and software from the end entity up to the root certificate. The chain of trust may ensure that only trusted devices and methods are used, while flexibility may still be retained. It may be noted that the secure boot module 203 may work based on the Public Key Infrastructure (PKI) process to authenticate various modules before allowing them to execute. These modules may include firmware drivers, option ROMs, UEFI drivers on disk, or UEFI boot loaders. The secure boot module 203 may further perform image authentication before execution, to reduce the risk of pre-boot malware attacks such as rootkits attacks.

The chain of trust may be further configured to allow multiple users to create and use policies on the computing device. It may be understood that creating and using policies may be relatively more difficult if all the keys are stored directly in hardware. The signing authority may be required to only sign boot programs that enforce security, such as only running programs that are themselves signed, or only allowing signed code to have access to certain features of the machine. This process may continue for several layers. Further, the digital certificates may be verified using the chain of trust. In some embodiments, a trust anchor for the digital certificate may be the root certificate authority.

The trusted platform module 209 may be configured to load trusted operating system boot-loaders. In some embodiments, the trusted platform module 209 may be an integral part of the trusted boot module 203. The trusted platform module 209 may also be configured to securely store and use cryptographic keys and measure a state of the platform. It may be noted that the state of the platform may be primarily related to creation or secure storage of platform measurements, certificates, and encryption keys to provide a strong device identity, and to attest the state of the computing device. In some embodiments, the trusted platform module 209 may be installed on a computing device's mainboard as a discrete component chip by the Original Equipment Manufactures (OEMs).

In alternative embodiments, the trusted platform module 209 may be implemented as a firmware-based solution on a device that may include Advanced RISC Machine's (ARM) Trusted Zone or INTEL's Platform Trust Technology (PTT) as integrated TPM. In such embodiments, the computing device with the trusted platform module 209 may secure data in a way that may require the original trusted platform module to unseal or decrypt them. The trusted platform module 209 may be used for device identification, authentication, encryption, measurement, and device integrity. It may be further noted that for the UEFI secure boot, a Platform Configuration Register (PCR) measurement may be implemented as per the Trusted Computing Group (TCG), Trusted Execution Environment Extensible Firmware Interface (TrEE EFI) Protocol. Further, in some embodiments, the trusted platform module 209 may require Endorsement Key (EK) certificates and Secure Hash Algorithm (SHA-256) based PCR banks and bootloader/firmware support for SHA-256 trusted platform module measurements. As will be appreciated, the (EK) certificates may be provided by Independent Hardware Vendors (IHV) or by Original Design Manufacturer (ODM) or by Original Equipment Manufacturer (OEM).

The measured boot module 210 may be configured to implement the trusted platform module 209 and the UEFI secure boot module 201. In some embodiments, the measured boot module 210 may be an INTEL TXT+INTEL (VT-d/VT-x). The measured boot module 210 may further be configured to provide strong hardware-based boot integrity protection through INTEL Boot Guard. In alternative embodiments, the combination of the trusted platform module 209 and the measured boot module 210 may be replaced by a combination of boot guard 211(A), BIOS guard 211(B) and OS guard 211(C). It may be noted that, in some embodiments, the boot guard 211(A), the BIOS guard 211 (B) and the OS guard 211(C) may be an INTEL boot guard, an INTEL BIOS guard and an INTEL OS guard, respectively. The boot guard 211(A) may be configured to prevent unauthorized software and malware of boot blocks critical to a system's function, thereby providing an added level of hardware-based platform security. In some embodiments, the boot guard 211(A) may cover three configurable boot types that may include measured boot module, verified boot module, and a combination of the measured boot module and the verified boot module. It may be further noted that the measured boot module may measure the Initial Boot Block (IBB) into platform protected storage device, such as the trusted platform module or INTEL Platform Trust Technology (PTT). The verified boot module may cryptographically verify the platform IBB using boot policy key. The combination of the measured boot module and the verified boot module may measure and verify the IBB.

In some embodiments, the boot guard 211(A) may be a processor that may prevent the computing device from running firmware images not released by the system manufacturer. When turned on, the processors may verify a signature contained in the firmware image before executing it. The signature may be verified using hash of a public half of a signing key, which may be fused into the system's Platform Controller Hub (PCH) by system manufacturer. The boot guard 211(A) may not be required to be activated during the system manufacturing. In general, the OEM may be responsible for configuring a public key for the verified boot and establishing boot policies. The security of the verified boot may be rooted to the OEM's key pair. The OEM may generate a 2048-bit key that may be only used for verifying the IBB, the private portion of which must be kept securely. The public portion of the key may then be programmed into field programmable fuses during the manufacturing process. Once written, it may not be possible to update these fuses, thereby providing a solid starting point for UEFI Secure Boot. The OEM may also be responsible for setting policies around what steps to take if boot integrity checks fail. By way of an example, the steps may include shutting down the system or entering into some sort of restricted repair mode.

In some embodiments, the BIOS guard 211(B) may be configured to protect the BIOS flash from modification without platform manufacturer authorization. This may help defend the platform against low-level DOS (denial of service) attacks, and may restore BIOS to a known good state after an attack. Additionally, in some embodiments, the OS guard 211(C) may be configured to provide two types of protection against escalation-of-privilege attacks, such as malware execution protection and user data access protection. The malware execution protection may prevent malware from executing code in application memory space. The OS guard 211(C) may instruct a processor not to execute any code that comes from application memory while the processor is in supervisor mode. The user data access protection may prevent malware from accessing data in user pages. The OS guard 211(0) may instruct the processor to block access to application memory while the processor is in supervisor mode. Further, in some embodiments, the boot guard 211(A) may protect secure boot module from firmware-based attacks by verifying that a trusted UEFI firmware is booting the platform, thereby establishing "Root of Trust". It should be noted that, when BIOS guard 211(B) is active, only guarded modules may be able to modify serial peripheral interface (SPI) flash memory. This may protect the device from persistent implants.

The platform validation module 212 may be configured to perform platform validation and testing of the firmware. The platform validation module 212 may include a Hardware Security Testability Specification (HSTI) module 213 which may be configured to validate default securing settings of the computing device. In some embodiments, for OEMs and ODMs the HSTI module may ensure that the computing device is configured securely out of the box, and that the system security is ensured without having to develop proprietary solutions. The purpose of HSTI module 213 may be to query the hardware and firmware designs and states so as to report security provisioning of the platform. The platform validation module 212 may further include hardware logo kit (HLK) 214 which may be configured to provide automated scheduling and execution of the driver tests that hardware vendors may be required to pass in order to qualify using the MICROSOFT Designed Windows Logo. In some embodiments, the HLK 214 may enable users to automate driver tests they may have created themselves. These tests may be mixed and matched with the Logo tests provided by MICROSOFT to create a custom test pass, which may enable organizations to use the DTM (Driver Test Manager) to validate drivers in any way they find appropriate.

The platform validation module 212 may further include a ChipSec module 215. The ChipSec module 215 may be a framework and configured to analyze security of device platforms including hardware, system firmware (BIOS/UEFI), and platform components. In some embodiments, the ChipSec module 215 may include an INTEL ChipSec module. In some embodiments, the ChipSec module 215 may include a security test suite, tools for accessing various low-level interfaces, and forensic capabilities. In such embodiments, the ChipSec module 215 may be run on various platforms, such as WINDOWS, LINUX, MAC OS X, and UEFI shell. The ChipSec module 215 may further find vulnerabilities in firmware, hypervisors and hardware configuration and explore low level system assets and even detect firmware implants.

By way of an example, in some embodiments, exemplary modules 213-215 of the platform validation module 212 may provide security measures for various security threats as per table A below:

TABLE A

| S. No | Device Security Checklist for OEMs | Tool Method |
| --- | --- | --- |
| 1 | UEFI/BIOS lock down configs | Hardware Security Testability Specification (HSTI)/ChipSec |
| 2 | UEFI/BIOS vulnerability assessment | ChipSec (fix all warnings and errors) |
| 3 | UEFI/BIOS updated Via UEFI Firmware Update | Via UEFI Firmware Update Capsule |
| 4 | Secure Memory Overwrite Request (MOR) enabled | HSTI |
| 5 | Platform Secure Boot enabled | HSTI |
| 6 | Boot Guard/Hardware Verified Boot | HSTI |
| 7 | Confirm enabled TPM 2.0 | Hardware Logo Kit (HLK) |
| 8 | Static DBX updated | HLK |
| 9 | Hypervisor-protected Code Integrity (HVCI) driver compliance | HLK |

The health attestation module 216 may communicate with measured boot module's data that may be protected by the Trusted Platform Module 209. As a result, after the device successfully boots, boot process measurement data may be sent to the health attestation module 216 using a more secure and tamper-resistant communication channel. In some embodiments, the health attestation module 216 may be a remote trusted cloud server. Additionally, in some embodiments, the health attestation module 216 may validate security related data points, including boot state such as Secure Boot, Debug Mode and the state of components that manage security. The health attestation module 216 may convey the health state of the computing device by sending a health encrypted blob back to the computing device. Upon receiving the health encrypted blob, the centralized platform policy module 217 in conjunction with the centralized certificate authority module 218 may provide a certification to the computing device depending upon verified digital signature so as to protect the computing device and maintain system integrity in accordance with the configured policy. As discussed below, the centralized platform policy module 217 may maintain policy that is to be configured and implemented on the computing device. Upon implementation, the policy may verify any changes at each and every level of the computing device. Further, the centralized certificate authority module 218 may maintain a repository for digital trust certificates corresponding to various hardware or software that may be installed on the computing device 101. As illustrated, in some embodiments, the digital trust certificates may include end entity certificates, intermediate certificates, and root certificates.

Now referring to FIG. 2B, the system 200 further may include a centralized platform policy module 217. The centralized platform policy module 217 may prevent the secure boot from the UFEI rootkits/bootkits infections through centralized managed policy such as Enterprise Security Guard on Guard Policy (ESG2P). As stated above, the ESG2P may provide end to end root of trust by enabling verification of the system firmware and software components. By providing the end to end root of trust, the ESG2P may establish strong hardware-rooted system integrity and hardware logic by OEM/BIOS manufacturers, and further may reduce chances of hardware backdoors. Thus, by utilizing digital trust certificates and the centralized managed policy, the computing device 101 may be able to more effectively manage and control secure boot guards.

It should be noted that various modules, components, or engines of the system 200 may be implemented in programmable hardware devices such as programmable gate arrays, programmable array logic, programmable logic devices, and so forth. Alternatively, various modules, components, or engines of the system 200 may be implemented in software for execution by various types of processors. An identified module, component, or engine of executable code may, for instance, include one or more physical or logical blocks of computer instructions which may, for instance, be organized as an object, procedure, function, or other construct. Nevertheless, the executables of an identified module, component, or engine need not be physically located together, but may include disparate instructions stored in different locations which, when joined logically together, include the module, component, or engine and achieve the stated purpose of the module, component, or engine. Indeed, a module, component, or engine of executable code could be a single instruction, or many instructions, and may even be distributed over several different code segments, among different applications, and across several memory devices.

As will be appreciated by one skilled in the art, a variety of processes may be employed for protecting a computing device from a malware. For example, the exemplary system 100, 200 may protect the computing device from the malware by the processes discussed herein. In particular, as will be appreciated by those of ordinary skill in the art, control logic and/or automated routines for performing the techniques and steps described herein may be implemented by the system 100, 200, either by hardware, software, or combinations of hardware and software. For example, suitable code may be accessed and executed by the one or more processors on the system 100, 200 to perform some or all of the techniques described herein. Similarly, application specific integrated circuits (ASICs) configured to perform some or all of the processes described herein may be included in the one or more processors on the system 100, 200.

Figure 3:
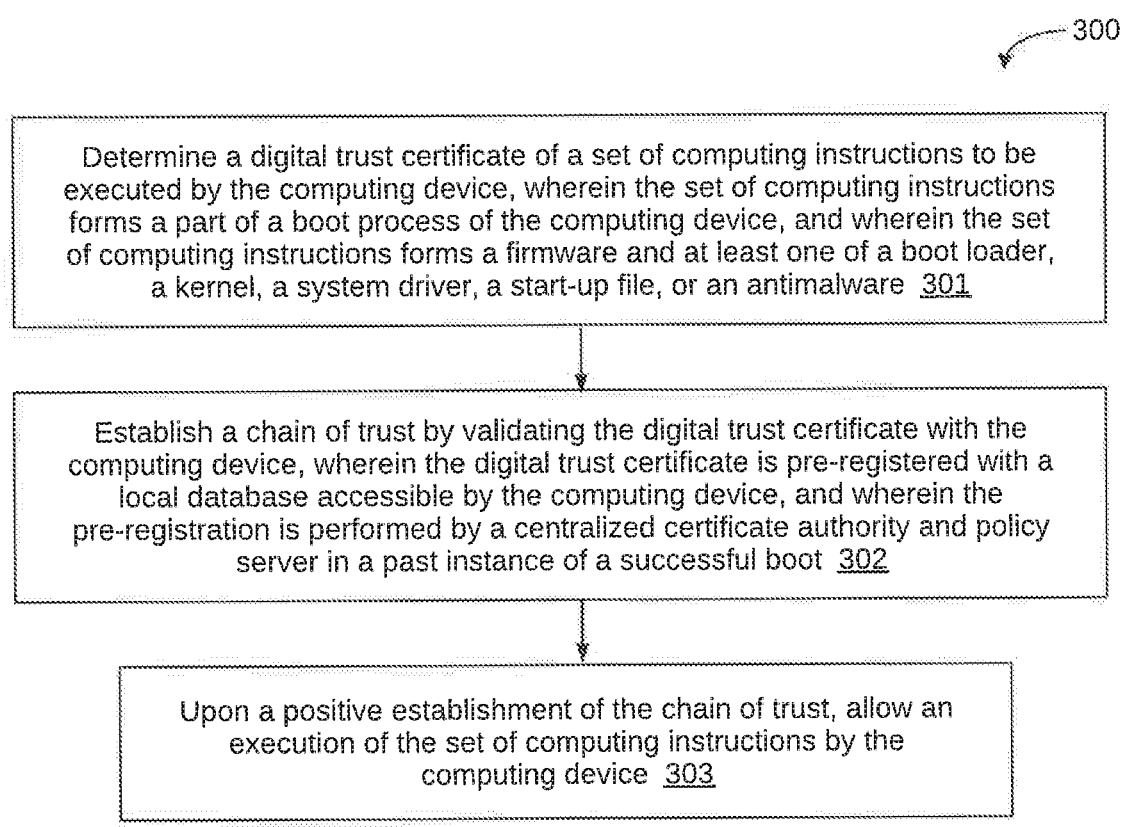
FIG. 3 is a flow diagram of an exemplary process for protecting a computing device from a malware, in accordance with some embodiments of the present disclosure.

Referring now to FIG. 3, an exemplary control logic 300 for protecting a computing device from a malware via a system, such as system 100, 200, is depicted via a flowchart in accordance with some embodiments of the present disclosure. The malware may include at least one of a rootkit infection, a bootkit infection, a virus, a worm, a Trojan horse, a ransomware, a remote access Trojan, a spyware, or an adware.

As illustrated in the flowchart, the control logic 300 may include the step of determining a digital trust certificate of a set of computing instructions to be executed by the computing device at step 301. It should be noted that the set of computing instructions may form a part of a boot process of the computing device. Further, it should be noted that the set of computing instructions may form a firmware and at least one of a boot loader (hypervisor) 204, a kernel 205, a system driver 206, a start-up file 207, or an antimalware 208.

The control logic 300 may further include the step of establishing a chain of trust by validating the digital trust certificate with the computing device at step 302. It should be noted that the digital trust certificate may be preregistered with a local database accessible by the computing device, and the pre-registration may be performed by a centralized certificate authority and policy server in a past instance of a successful boot. The chain of trust may ensure that only trusted devices and software are used, while flexibility may be retained. As stated above, the centralized certificate authority and policy server may be a trust anchor for the digital trust certificate.

Upon a positive establishment of the chain of trust, the control logic 300 may further include the step of allowing an execution of the set of computing instructions by the computing device at step 303. However, upon a negative establishment of the chain of trust, the control logic 300 may further include the step of effecting a remedial action by isolating the set of computing instructions and by allowing an execution of a previous set of computing instructions by the computing device. As will be appreciated, the previous set of computing instructions may include at least one of a previous instance of firmware, boot loader (hypervisor), a kernel, a system driver, a start-up file, or an antimalware that resulted in positive establishment of the chain of trust and therefore a successful booting process.

In some embodiments, validating the digital trust certificate at step 302 may include validating a trust key of the set of computing instructions with a platform key (PK) of the computing device. As will be appreciated, the platform key (PK) may be provided by the firmware or by the hardware manufacturers. It should be noted that the trust key may be pre-registered with the local database. Additionally, it should be noted that the local database may be accessible by the computing device during the boot process and prior to a successful boot. Further, in some embodiments, the trust key of the set of computing instructions may be validated with the platform key of the computing device using a hash of at least one of a public half or a private half of the digitally signed key. Further, a trust relationship between OS vendors and users may be established by signing their keys with the platform key (PK).

Further, in some embodiments, validating the digital trust certificate at step 302 may include the step of validating the digital trust certificate by a boot guard 211(A), a BIOS guard 211(B), and an operating system (OS) 211(C) guard. As mentioned earlier, the chain of trust may be provided by the trusted boot module 203, as the operating system boots. In some embodiments, the trusted boot module 203 may include the hypervisor 204 and the kernel 205. The kernel 205 may be configured to verify each of the other component of the OS startup process, such as boot drivers 206 (also referred to as system driver 206), startup files 207 (also referred to as system files 207), and antimalware launching components 208 (also referred to as antimalware 208). The chain of trust, therefore, may verify the signed code (true integrity) of each of the boot loader 204, the kernel 205, the system driver 206, the system files 207 and the antimalware 208 to thereby provide strong protection against tampering or malware infection.

As stated above, in some embodiments, the digital trust certificate may be validated by a combination of INTEL Boot Guard, INTEL BIOS Guard and INTEL OS Guard, or by Trusted Platform Module (TPM) 2.0, or by a combination of INTEL Platform Trust Technology (PTT), INTEL Trusted Execution Technology (TXT), and INTEL Virtualization Technology for Directed I/O (VT-d) or INTEL Virtualization Technology for x86 processors (VT-x). Further, validation may include performing authentication, by Public Key Infrastructure (PKI) process, of at least one of firmware drivers, option ROMs, UEFI drivers on disk, or UEFI boot loaders before their execution. As will be appreciated, in some embodiments, such validation may provide for the strong hardware based "Root of Trust", and, therefore, a chain of trust. In other word, the ESG2P policy may provide a strong mechanism to protect the UEFI firmware or infections from rootkit/bootkits through multiple means, and each one may be consider for further reducing the real-time threats. As discussed above, these means may include secure boot with TPM 2.0 or secure boot with Intel PTT along with Intel TXT+Intel (VT-d/VT-x), or secure boot with INTEL based guards.

It should be noted that, in some embodiments, the chain of trust may include an end-to-end chain of trust including a hardware based root of trust. It should be noted that the hardware based root of trust may provide for the system integrity. In such embodiments, establishing the chain of trust may include validating the hardware based root of trust by a boot guard, a BIOS guard, and an operating system (OS) guard. Moreover, in such embodiments, validating the hardware based root of trust may include validating the platform key (PK) that's implemented into a firmware or a hardware by a manufacturer.

Figure 4:
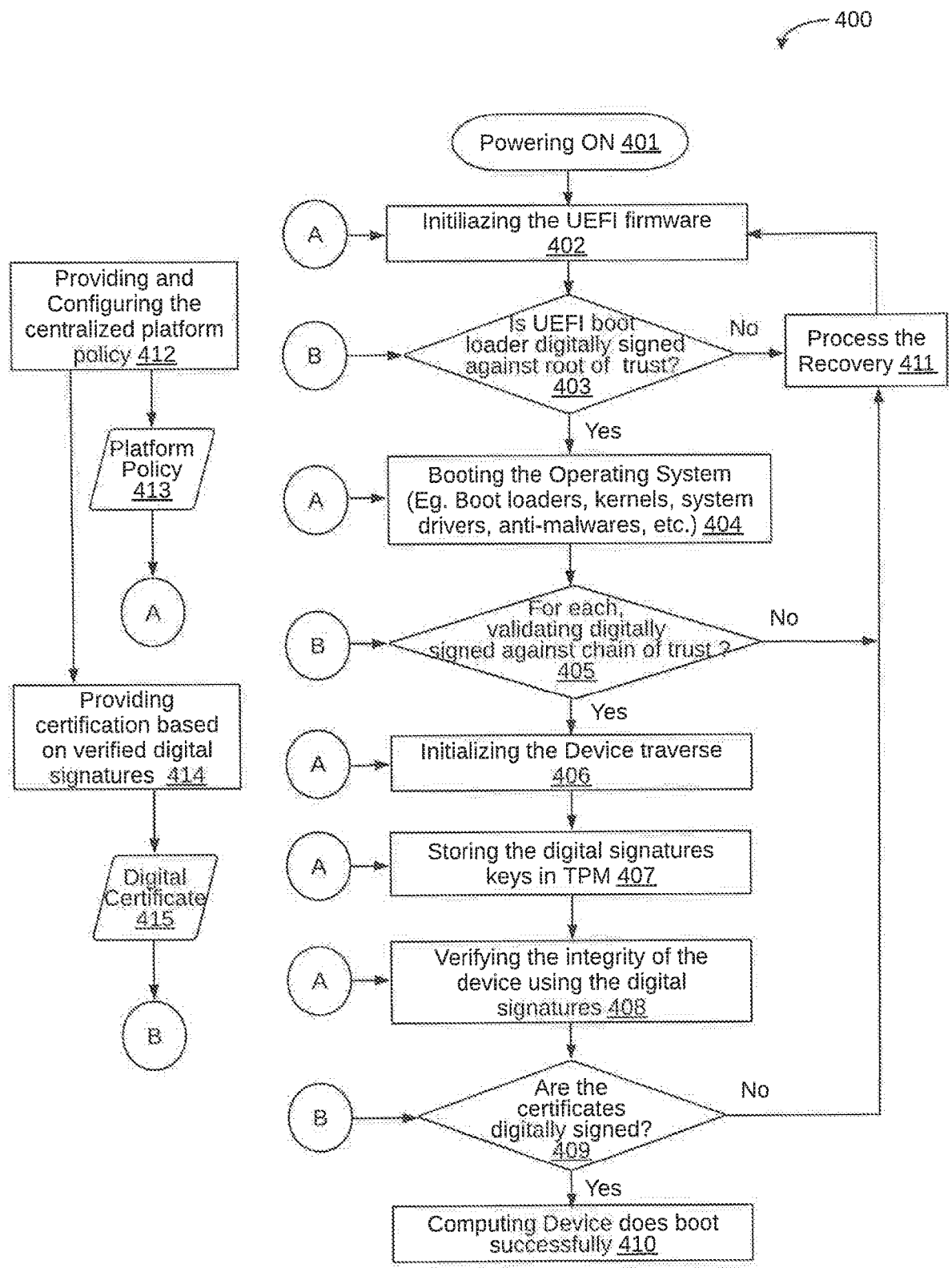
FIG. 4 is a flow diagram of a detailed exemplary process for protecting a computing device from a malware by creating and managing secure boot keys, in accordance with some embodiments of the present disclosure.

Referring now to FIG. 4, an exemplary control logic 400 for creating and managing secure boot keys is depicted in greater detail via a flowchart, in accordance with some embodiments of the present disclosure. As illustrated in the flowchart, at step 401, the computing device may be powered ON. Further, at step 402, UEFI firmware may be initialized. Upon initializing the UEFI firmware, a signature of each piece of boot module may be verified. Thus, at step 403, a check may be performed to determine whether a UEFI boot loader is digitally signed against "Root of Trust" or not. If it is determined that the UEFI boot loader is digitally signed against "Root of Trust", the control logic 400 may proceed to step 404.

At step 404, the operating system (OS) may be booted. It may be noted that booting of the operating system may include, but may not be limited to, loading and execution of boot loaders, kernels, system derivers, or anti-malwares. As will be appreciated, during the boot process, a signature of each of these components may be verified. Thus, at step 405, a check maybe performed to determine whether digital signature for each of the boot loaders, the kernels, the system derivers, and the anti-malwares is valid or not. If the digital signature for each of the components is determined to be valid, the control logic 400 may then proceed to step 406.

At step 406, a device traverse may be initialized. Additionally, at step 407, digital signature keys may be stored in the trusted platform module (TPM) 209. Further, at step 408, integrity of the device may be verified. It may be noted that the integrity of the device may be verified using the digital signatures. In some embodiments, the device may be verified by verifying the digital signature contained in the firmware image before executing it and using the hash of the public half of the signing key, which may be fused into the system's Platform Controller Hub (PCH) by the system manufacturer. In an alternate embodiment, the device may be verified by validating the security related data points, including boot state such as Secure Boot, Debug Mode, and the state of components that manage security. At step 409, a check may be performed to determine if the certificates are digitally signed or not. If the certificates are digitally signed, the control logic 400 may proceed to step 410. At step 410, the computing device may boot successfully.

However, if the check fails at steps 403, 405, or 409, the control logic 400 may proceed to step 411. At step 411, the recovery of the computing device may be processed. In other words, when the verification fails or when the digital signatures are missing from the certificates, a check may be performed on the system for recovery. Thus, if it is determined, at step 403, that the UEFI boot loader is not digitally signed against root of trust, the control logic may proceed to step 411. Similarly, if it is determined, at step 405, that the digital signature for each of the boot loaders, the kernels, the system derivers and the anti-malwares is invalid, the control logic 400 may proceed to step 411. Again, if it is determined, at step 409, that the certificates are not digitally signed, the control logic 400 may proceed to step 411. As a part of the recovery, a remedial action may be initiated by isolating a set of computing instructions and by allowing an execution of a previous set of computing instructions by the computing device. It may be noted that the previous set of computing instructions may correspond to the computing instructions that may have led to a positive establishment of the chain of trust, thereby allowing an execution of the set of computing instructions by the computing device, in a past instance.

Additionally, in some embodiments, at step 412, the centralized platform policy 413 may be provided to the computing device and configured on the computing device. As discussed above, the centralized platform policy 413 may be provided to the computing device from an external policy server. Upon configuration, the centralized platform policy 413 may be implemented on the computing device, for example, as illustrated in the flowchart, the centralized platform policy 413 may be implemented at steps 402, 404, 406, 407, and 408 of the control logic 400 as means of controlling the process. For example, at step 402, the centralized platform policy 413 may be provided for controlling the initialization of the UEFI firmware. Similarly, at step 404, the centralized platform policy 413 may be provided for controlling the booting of the operating system. It should be noted that the booting of the operating system, may include, but may not be limited to, loading and executing the boot loaders, the kernels, the system derivers, and the anti-malwares. Similarly, at steps 406, 407, and 408, the centralized platform policy 413 may be provided for initializing the device traverse, for storing the digital signature keys in the TPM 209, and for verifying the integrity of the device using the digital signatures. It should be noted that, in some embodiments, the centralized platform policy may be controlled when the certificates are verified with the digital signature.

Further, in some embodiments, at step 414, the digital certificates 415 may be provided to the computing device. As discussed above, the digital certificates 415 may be provided to the computing device from an external certificate authority. It should be noted that the digital certificates 415 may be provided based on verified digital signatures. Upon receipt of digital certificates keys, the same may be employed to establish "Root of Trust" or end-to-end "Chain of Trust", For example, as illustrated in the flowchart, the digital certificates 415 may be used to perform verification at steps 403, 405, 409 of the control logic 400. For example, at step 403, the certification based on verified digital signatures may be provided to the UEFI boot loader. It may then be verified if the UEFI boot loader is digitally signed against root of trust or not. Similarly, at step 405, certification based on verified digital signatures may be provided to each of the components of the operating system (e.g., boot loaders, kernels, system derivers, and anti-malwares). Each of these components may then be validated if they are digitally signed against chain of trust or not. Similarly, at step 409, the integrity of the device may be verified upon determining that the digital certificates are digitally signed or not.

Figure 5:
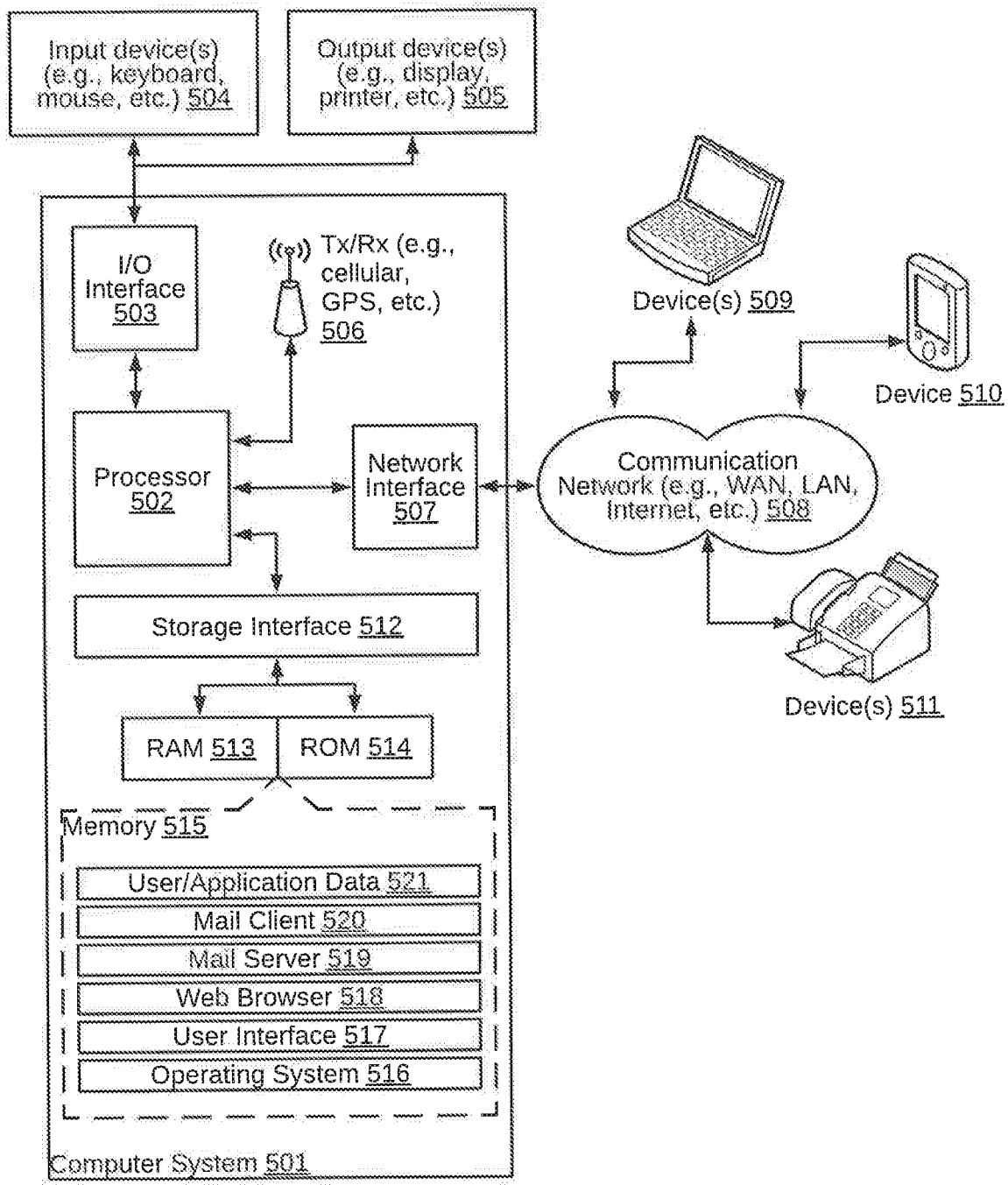
FIG. 5 is a block diagram of an exemplary computer system for implementing embodiments consistent with the present disclosure.

Referring now to FIG. 5, a block diagram of an exemplary computer system 501 for implementing embodiments consistent with the present disclosure is illustrated. Variations of computer system 501 may be used for implementing system 100 for protecting a computing device from a malware. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POVVERPC®, INTEL® CORE® processor, ITANIUM® processor, XEON® processor, CELERON® processor or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/gln/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc, Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS® WILINK WL1283®, BROADCOM® BCM4750IUB8®, INFINEON TECHNOLOGIES®

X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK®, etc.), laptop computers, notebooks, gaming consoles (MICROSOFT® XBOX®, NINTENDO® DS®, SONY® PLAYSTATION®, etc.), or the like. In some embodiments, the computer system 501 may itself embody one or more of these devices.

In some embodiments, the processor 502 may be disposed in communication with one or more memory devices (e.g., RAM 513, ROM 514, etc.), collectively referred to as memory 515, via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 5151 may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 501 may implement a web browser 518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 501 may implement a mail server 519 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 501 may implement a mail client 520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 501 may store user/application data 521, such as the data, variables, records, etc. (e.g., ongoing network traffic transaction data, historical network traffic transaction data, training data, learnt relationship or machine learning model, recurring load patterns, current peak traffic level, predicted upcoming load congestion level, pre-configured images, service instances, and so forth) as described in this disclosure. Such databases may be implemented as fault-tolerant, relational, scalable, secure databases such as ORACLE® or SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may provide for protecting a computing device from a malware by providing a centralized platform policy, such as Enterprise Security Guard on Guard Policy (ESG2P), for creating and managing the secure boot keys and to prevent the secure boot from the UFEI rootkits/bootkits infections. The techniques may be further configured to verify the integrity of the device using the digital signatures. Further, the techniques may be configured to issue the certification based on verified digital signatures, and control the centralized platform policy, when the certificates are verified with the digital signature. In short, the techniques cover end to end root of trust by enabling verification of the system firmware and software components, and establish a strong, hardware-rooted system integrity and hardware logic by OEM/BIOS manufacturer so as to reduce the chances of hardware backdoors. By way of an example, the techniques may protect firmware of the computing devices from each type or stages of UEFI rootkit infections, namely, a) user-mode rootkit infection, which execute client-side exploit drop installer and elevate privileges of the installer to system level, b) kernel-mode rootkit infection, which bypass code signing policies and install kernel-mode payload, c) system management mode (SMM) rootkit infection, which execute SMM exploit and elevate privileges to SMM and execute SMM payload, and d) SPI-flash rootkit infection, which bypass flash write protection and install rootkit into firmware.

Further, as will be appreciated by those skilled in the art, the ESG2P may be vendor neutral security standard policy so as to ensure broad compatibility for managing and controlling trust and integrity for secure boot process. Additionally, the ESG2P may be a hardware agnostic centralized policy so as to ensure superlative hardware-based protection. Further, the ESG2P may be centrally managed running on a remote server that may control end-to-end root of trust and chain of trust, and that may establish a strong system integrity. Further, the ESG2P may be operating system (OS) agnostic that may run for cross platform operating systems, such as WINDOWS Open source LINUX/UNIX, ANDROID and iOS. Moreover, the ESG2P may provide key elements that may form the basis of providing one or more security-specific functions through hardware-based root of trust and the chain of trust which may cryptographically measure or verify the integrity. It should be noted that, the security-specific functions may include measurement, storage, reporting, verification, update, etc. It may be understood that a root of trust may be a first element in a chain of trust and may serve as an anchor in a chain of trust to deliver more complex functionality.

Additionally, as will be appreciated, the techniques described above may support virtual secure mode (VSM) or virtualization based security (VBS). The techniques may be capable of running various validating and testing tools, such as HSTI, ChipSec, and HLK so as to secure computing devices. Further, the techniques may provide device health attestation by MICROSOFT or remote health attestation by Trusted Computing Group (TCG) so as to allow authorized parties to detect changes to the computing device.

The specification has described system and method for protecting a computing device from a malware. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of protecting a computing device from a pre-boot malware, the method comprising:
   determining a digital trust certificate of a set of computing instructions to be executed by the computing device, wherein the set of computing instructions forms a part of a boot process of the computing device, and wherein the set of computing instructions are associated with a firmware, and different levels of components comprising a boot loader, a kernel, a system driver, a start-up file, and an antimalware;
   managing and controlling, an end-to-end chain of trust and hardware root of trust of the computing device upon validating the digital trust certificate and verifying integrity of an operating system (OS) boot process in the computing device, using a policy server,
   wherein the policy server stores a centrally managed policy along with a certificate authority that manages and controls a boot guard, a BIOS guard, and an OS guard to validate and measure the integrity between each boot component involved in the OS boot process of the computing device,
   wherein the boot guard measures and cryptographically verifies an Initial Boot Block (IBB) into a platform protected storage device using a boot policy key, wherein the BIOS guard protects a BIOS flash from modification without platform manufacturer authorization, and wherein the OS guard provides malware execution protection and user data access protection against escalation-of-privilege attacks,
   wherein the centrally managed policy defines superlative hardware-based protection for changes at each and every level of components in the computing device,
   wherein validating the digital trust certificate comprises validating a trust key of the set of computing instructions with a platform key of the computing device, and wherein the trust key is pre-registered with the local database,
   wherein the digital trust certificate is pre-registered with a local database accessible by the computing device, and wherein the pre-registration is performed by the centralized certificate authority and the policy server in a past instance of a successful boot;
   upon a positive establishment of the chain of trust, allowing an execution of the set of computing instructions by the computing device; and
   upon a negative establishment of the chain of trust, effecting a remedial action by isolating the set of computing instructions and by allowing an execution of a previous set of computing instructions by the computing device, wherein the previous set of computing instructions comprises a previous instance of the firmware, the boot loader, the kernel, the system driver, the start-up file, and the antimalware that resulted in the positive establishment of the chain of trust.

2. The method of claim 1, wherein the trust key of the set of computing instructions is validated with the platform key of the computing device using a hash of at least one of a public half or a private half of the digitally signed key that is fused into a Platform Controller Hub (PCH) of the computing device.

3. The method of claim 1, wherein the local database is accessible by the computing device during the boot process and prior to a successful boot.

4. The method of claim 1, wherein the pre-boot malware comprises at least one of a rootkit infection, a bootkit infection, a virus, a worm, a Trojan horse, a ransomware, a remote access Trojan, a spyware, or an adware.

5. The method of claim 1, wherein the chain of trust comprises an end-to-end chain of trust comprising a hardware based root of trust, and wherein establishing the chain of trust comprises validating the hardware based root of trust by the boot guard, the BIOS guard, and the OS guard.

6. The method of claim 5, wherein validating the hardware based root of trust comprises validating the platform key (PK) that's implemented into a firmware or a hardware by a manufacturer.

7. A system, comprising:
a computing device comprising at least one processor and a computer-readable medium storing instructions that, when executed by the at least one processor, cause the at least one processor to perform operations for protecting the computing device from a pre-boot malware, the operations comprising:
determining a digital trust certificate of a set of computing instructions to be executed by the computing device, wherein the set of computing instructions forms a part of a boot process of the computing device, and wherein the set of computing instructions are associated with a firmware and different levels of components comprising a boot loader, a kernel, a system driver, a start-up file, and an antimalware;
managing and controlling, an end-to-end chain of trust and hardware root of trust upon validating the digital trust certificate and verifying integrity of an operating system (OS) boot process in the computing device, using a policy server,
wherein the policy server stores a centrally managed policy along with a certificate authority that manages and controls a boot guard, a BIOS guard, and an OS guard to validate and measure the integrity between each boot component involved in the OS boot process of the computing device,
wherein the boot guard measures and cryptographically verifies an Initial Boot Block (IBB) into a platform protected storage device using a boot policy key, wherein the BIOS guard protects a BIOS flash from modification without platform manufacturer authorization, and wherein the OS guard provides malware execution protection and user data access protection against escalation-of-privilege attacks,
wherein the centrally managed policy defines superlative hardware-based protection for changes at each and every level of components in the computing device;
wherein validating the digital trust certificate comprises validating a trust key of the set of computing instructions with a platform key of the computing device, and wherein the trust key is pre-registered with the local database,
wherein the digital trust certificate is pre-registered with a local database accessible by the computing device, and wherein the pre-registration is performed by a centralized certificate authority and the policy server in a past instance of a successful boot;
upon a positive establishment of the chain of trust, allowing an execution of the set of computing instructions by the computing device; and
upon a negative establishment of the chain of trust, effecting a remedial action by isolating the set of computing instructions and by allowing an execution of a previous set of computing instructions by the computing device, wherein the previous set of computing instructions comprises a previous instance of the firmware, the boot loader, the kernel, the system driver, the start-up file, and the antimalware that resulted in the positive establishment of the chain of trust.

8. The system of claim 7, wherein the trust key of the set of computing instructions is validated with the platform key of the computing device using a hash of at least one of a public half or a private half of the digitally signed key that is fused into a Platform Controller Hub (PCH) of the computing device.

9. The system of claim 7, wherein the local database is accessible by the computing device during the boot process and prior to a successful boot.

10. The system of claim 7, wherein the chain of trust comprises an end-to-end chain of trust comprising a hardware based root of trust, and wherein establishing the chain of trust comprises validating the hardware based root of trust by the boot guard, the BIOS guard, and the operating system (OS) guard.

11. The system of claim 10, wherein validating the hardware based root of trust comprises validating the platform key (PK) that's implemented into a firmware or a hardware by a manufacturer.

12. A non-transitory computer-readable medium storing computer-executable instructions when processed by at least one processor cause a system to protect a computing device from a pre-boot malware, by:
determining a digital trust certificate of a set of computing instructions to be executed by the computing device, wherein the set of computing instructions forms a part of a boot process of the computing device, and wherein the set of computing instructions are associated with a firmware and different levels of components comprising a boot loader, a kernel, a system driver, a start-up file, and an antimalware;
managing and controlling, an end-to-end chain of trust and hardware root of trust of the computing device upon validating the digital trust certificate and verifying the integrity of an operating system (OS) boot process in the computing device, using a policy server,
wherein the policy server stores a centrally managed policy along with a certificate authority that manages and controls a boot guard, a BIOS guard, and an operating system (OS) guard to validate and measure the integrity between each boot component involved in the OS boot process of the computing device,
wherein the boot guard measures and cryptographically verifies an Initial Boot Block (IBB) into a platform protected storage device using a boot policy key, wherein the BIOS guard protects a BIOS flash from modification without platform manufacturer authorization, and wherein the OS guard provides malware execution protection and user data access protection against escalation-of-privilege attacks, wherein validating the digital trust certificate comprises validating a trust key of the set of computing instructions with a platform key of the computing device, wherein the trust key is pre-registered with the local database, and wherein the digital trust certificate is pre-registered with a local database accessible by the computing device, and wherein the pre-registration is performed by a centralized certificate authority and the policy server in a past instance of a successful boot;

upon a positive establishment of the chain of trust, allowing an execution of the set of computing instructions by the computing device; and upon a negative establishment of the chain of trust, effecting a remedial action by isolating the set of computing instructions and by allowing an execution of a previous set of computing instructions by the computing device, wherein the previous set of computing instructions comprise a previous instance of the firmware, the boot loader, the kernel, the system driver, the start-up file, and the antimalware that resulted in the positive establishment of the chain of trust.

13. The non-transitory computer-readable medium of claim 12, wherein the trust key of the set of computing instructions is validated with the platform key of the computing device using a hash of at least one of a public half or a private half of the digitally signed key that is fused into a Platform Controller Hub (PCH) of the computing device.

* * * * *